3,480,158
IDLER ROLL ASSEMBLY
Anthony K. Pandjiris, St. Louis, and Arthur I. Frederick, Webster Groves, Mo., assignors to The Pandjiris Weldment Co., St. Louis, Mo., a corporation of Missouri
Filed Jan. 9, 1967, Ser. No. 608,188
Int. Cl. B23k 37/04; B65g 7/04
U.S. Cl. 214—1                                    2 Claims

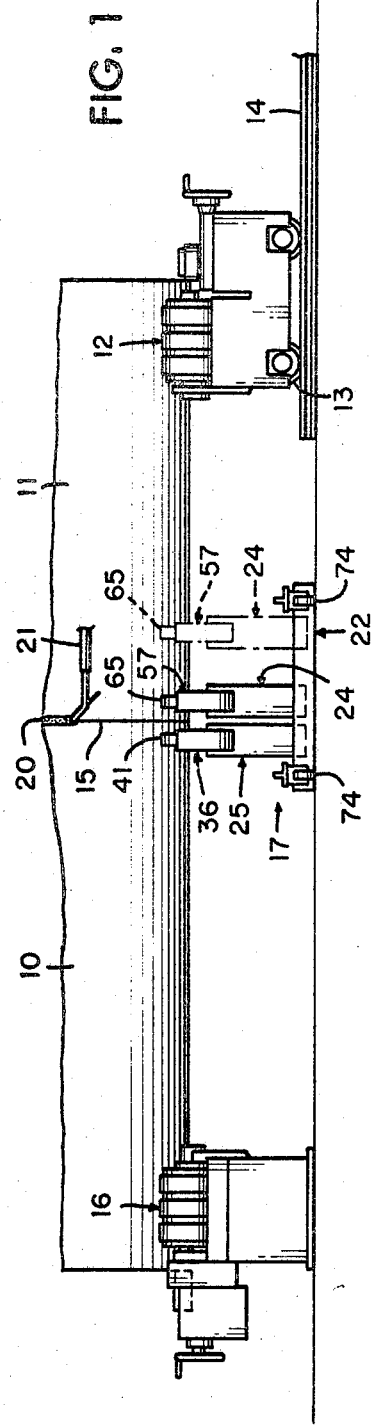

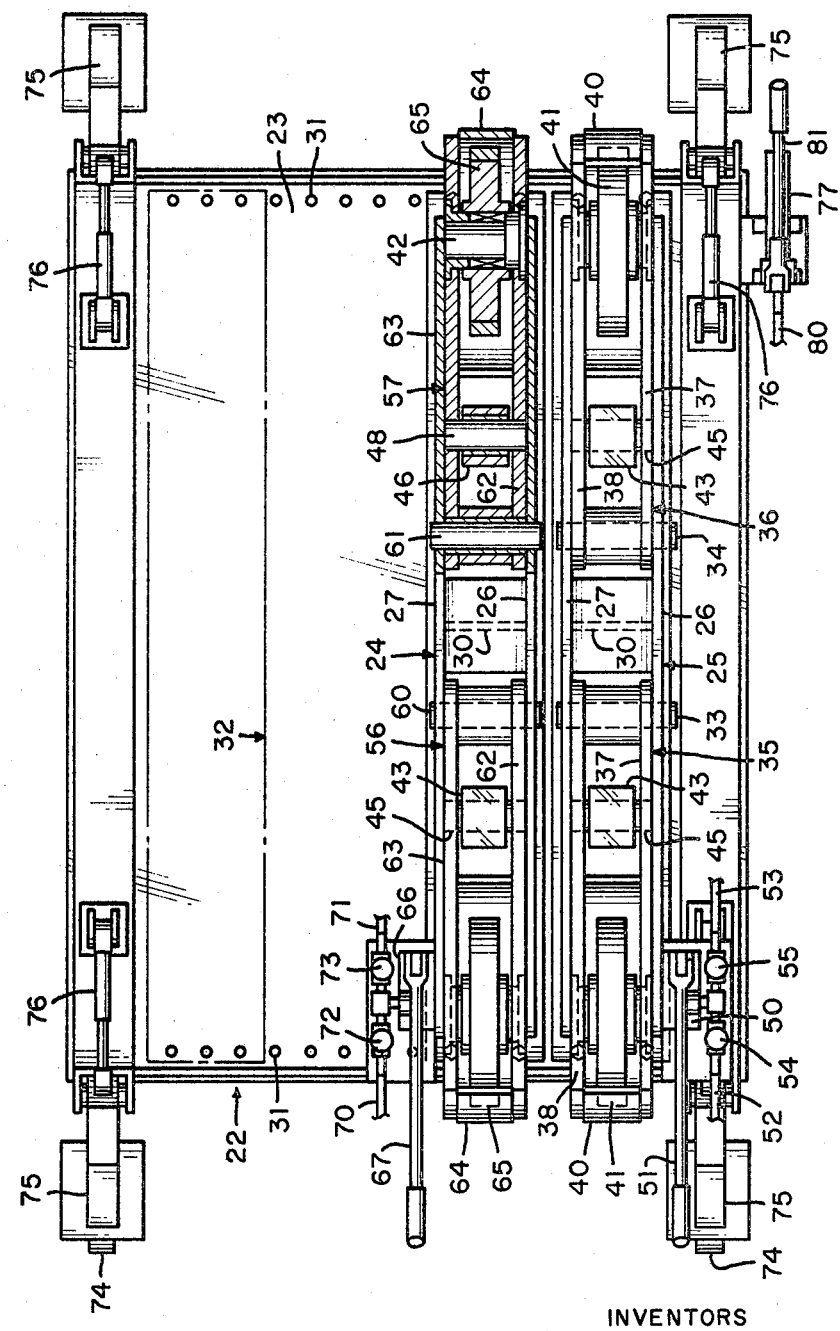

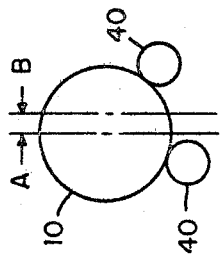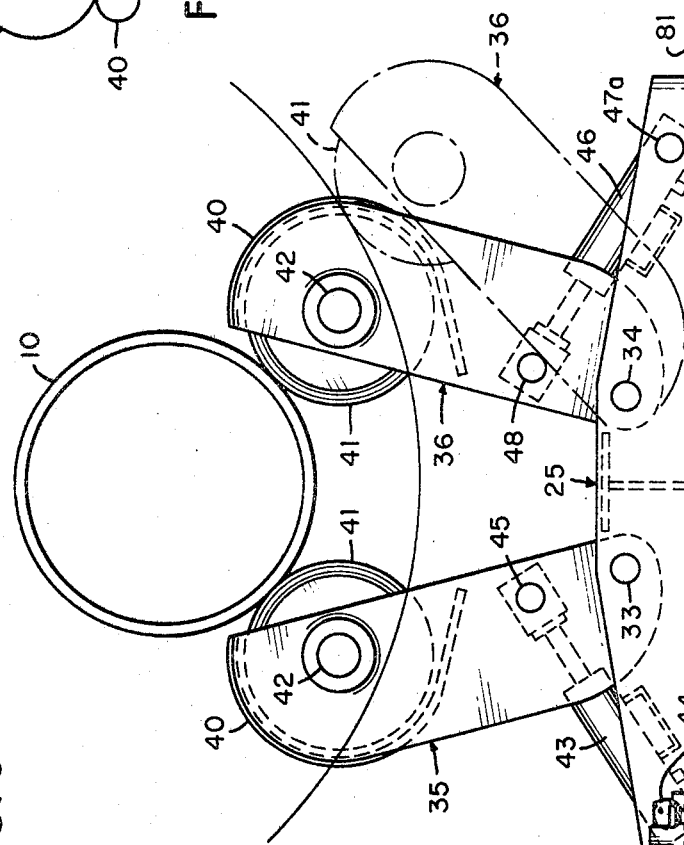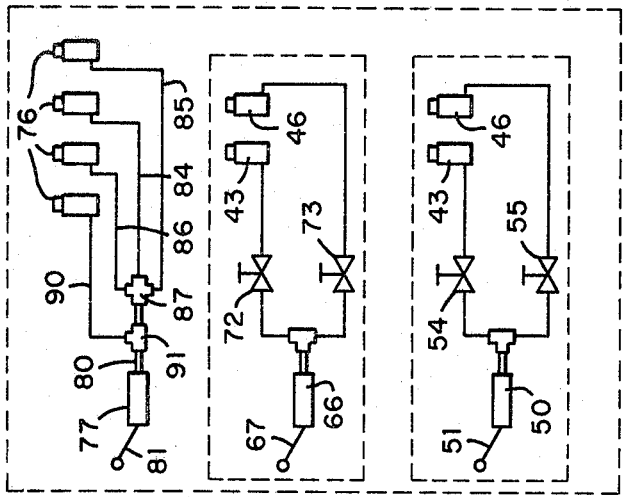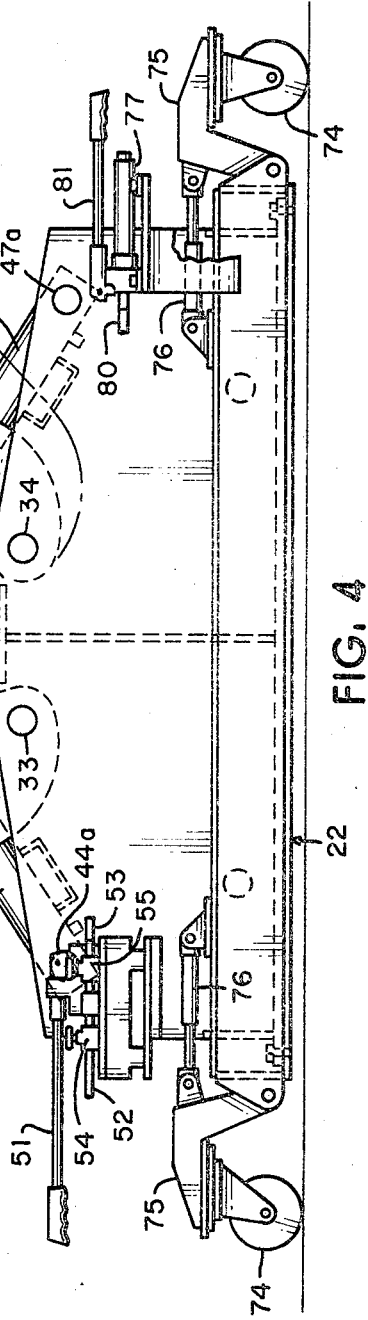
FIG. 6
FIG. 5
FIG. 4
INVENTORS
ANTHONY K. PANDJIRIS
ARTHUR I. FREDERICK
BY Cohn and Powell
ATTORNEYS

United States Patent Office 3,480,158
Patented Nov. 25, 1969

ABSTRACT OF THE DISCLOSURE

An idler roll assembly having pivotally mounted pairs of roll frames that are individually adjustable about pivot axes for selectively adjusting either or both the vertical and horizontal positions of different workpieces, supported and rotatable on wheels carried by the roll frames, in order to align adjacent portions of the workpieces precisely in a joint suitable for welding operation. At least one pair of roll frames is positioned at each side of the joint. The system, incorporating the idler roll assembly, has a powered turning roll unit, remote from the joint, supporting and rotating one workpiece, while other means, remote from the joint, rotatively supports the other workpiece.

BACKGROUND OF THE INVENTION

This invention relates generally to improvements in an idler roll assembly, and more particularly to an improved idler roll assembly adapted to support and adjustably position a workpiece for welding operation, and to the system in which the idler roll assembly is utilized.

It is conventional to use turning rolls to support and turn a horizontally disposed cylindrical tank at a predetermined rate incident to the welding of annular seams. Turning rolls of this general type are disclosed in U.S. Patent No. 3,250,415. Each roll assembly has a pair of wheels located on opposite sides of the rotative longitudinal axis of the tank, the wheels being adapted to support the load.

It has been a difficult and time-consuming job to align the adjacent portions of two workpieces accurately to form a joint suitable for tacking and subsequent welding of an annular seam. In many instances, the turning rolls, as units, had to be physically moved or shifted from one location to another. The present idler roll assembly overcomes these difficulties and disadvantages by the provision of wheels, supporting opposite sides of a tank, which are individually adjustable about a pivot axis, whereby to adjust the vertical and/or horizontal position of the supported tank quickly and easily incident to aligning such tank readily with a cooperating workpiece for welding operation.

SUMMARY OF THE INVENTION

The idler roll assembly for supporting and adjustably positioning a workpiece includes a first pair of roll frames pivotally mounted to a base in side by side relation on spaced, substantially parallel pivot axes. A wheel is rotatively mounted on each roll frame, the wheels being adapted to support a workpiece therebetween. An actuating means is operatively connected to the roll frames for individually adjusting the roll frames about the pivot axes so as to adjust either or both the vertical and horizontal positions of the workpiece supported on the wheels.

The first pair of roll frames are each movable toward or away from each other between angular limits about the associated pivot axis. The actuating means is operatively connected to the roll frames to enable an infinite adjustment individually of each roll frame between the angular limits.

The idler roll assembly includes a second pair of roll frames pivotally mounted to the base in side by side relation on spaced, substantially parallel pivot axes, the second pair of roll frames being laterally adjacent the said first pair of roll frames. A wheel is rotatively mounted on each of the second pair of roll frames, and an actuating means is operatively connected to the second pair of roll frames for individually adjusting these roll frames about the associated pivot axes in order to adjust either or both the vertical and horizontal positions of the workpiece supported on the wheels of the second pair of roll frames. It is advantageous that the wheels of the laterally adjacent first and second pairs of roll frames support different workpieces arranged so that their laterally adjacent portions form the weld joint between the first and second pairs of roll frames.

The system for supporting and rotating a pair of workpieces, arranged to provide a joint therebetween, includes an idler roll assembly supporting and adjustably positioning the workpieces at the joint, while a powered turning roll unit, remote from the joint, supports and rotates one workpiece, and other means, remote from the joint, rotatively supports the other workpiece.

BRIEF DESCRIPTION OF THE DRAWINGS

FIG. 1 is a side elevational view of the system for supporting and rotating a pair of workpieces for welding operation;

FIG. 2 is a side elevational view of the idler roll assembly utilized in the system of FIG. 1;

FIG. 3 is a top plan view of the idler roll assembly shown in FIG. 2;

FIG. 4 is a side elevational view, similar to FIG. 2, but illustrating a modified connection of the actuating means;

FIG. 5 discloses schematic diagrams of the actuating means for the idler roll assembly, and FIG. 6 is a graphic representation of the idler roll assembly holding the workpiece off center of the idler roll assembly.

DESCRIPTION OF THE PREFERRED EMBODIMENT

Referring now by characters of reference to the drawings, and first to FIG. 1, it will be understood that the system for suporting and rotating a pair of workpieces 10 and 11, provided by cylindrical tanks, in longitudinal alignment incident to forming a welded annular seam, includes a powered turning roll 12 of the general type disclosed and claimed in U.S. Patent No. 3,250,415. For convenience in location, the power turning roll 12 is mounted by wheels 13 on a longitudinal track 14 aligned substantially parallel to the longitudinal rotative axis of workpieces 10 and 11. The power turning roll 12 supports and rotates one end of workpiece 11, remote from the weld joint 15.

A cooperating and substantially matching idler roll unit referred to by 16, which may be of the general type disclosed in U.S. Patent No. 3,250,415, mentioned previously, supports rotatively the other workpiece 10 at a location remote from the weld joint 15. In the preferred arrangement, the idler roll unit 16 rests on the ground and is not readily movable as is the powered turning roll unit 12.

Located between the powered turning unit 12 and the operating idler roll unit 16, is an idler roll assembly generally indicated by roll 17, which is adapted to support and position both of the workpieces 10 and 11 substantially at the weld joint 15. As will be understood upon later detailed description of parts, the idler roll assembly 17 can separately or in combination adjust either or both the vertical and horizontal positions of the adjacent end portions of workpieces 10 and 11 in order to align such adjacent end portions accurately to form the suitable weld joint 15. The weld seam 20 indicated in FIG. 1 at the joint 15 is applied by a weld torch 21.

From FIGS. 2 and 3, it will be apparent that the idler roll assembly 17 includes a base referred to by 22 having a substantially horizontal platform 23 and a plurality of brackets 24 and 25 seated on and extending upwardly from the platform 23. Each of the brackets 24 and 25 consists of a pair of laterally spaced, parallel plates 26 and 27 extending substantially from one end of the platform 23 to the other end. The cooperating plates 26 and 27 of each bracket 24 and 25 are operatively interconnected by a transverse brace 30.

The brackets 24 and 25 are disposed in laterally adjacent relation and are detachably fixed in position on the platform 23. Each end of the platform 23 is provided with a series of regularly spaced bolt holes 31 to facilitate attachment of either one or both of the brackets 24 and 25 in a plurality of different laterally spaced positions. For example, the brackets 24 can be selectively moved from the position shown in full lines in FIG. 3 closely adjacent the associated bracket 25 to a position considerably spaced laterally from such bracket 25 at the other side of the platform 23, as is indicated by the phantom block outline of such bracket referred to by reference numeral 32. The purpose and functional advantages of this selective lateral adjustment of either one or both of the brackets 24–25 will become apparent upon further detailed description of parts.

Pivotally mounted on a pair of spaced pivot pins 33 and 34 are a pair of roll frames generally referred to by 35 and 36 respectively, the pivot pins 33 and 34 defining substantially parallel pivot axes. Specifically, the roll frames 35 and 36 are pivotally mounted within the spaced plates 26 and 27 of bracket 25, and are disposed in side by side relation. Each of the roll frames 35 and 36 includes a pair of spaced frame plates 37 and 38. The outermost ends of the spaced frame plates 37 and 38, of the roll frames 35 and 36, are partially enclosed by wheel guards 40.

Rotatively mounted near the outermost end of each of the roll frames 35 and 36 is a wheel 41, the wheel 41 being mounted on a shaft 42 defining a rotative axis. The wheels 41 are located between the frame plates 37 and 38 of the associated roll frame 35 or 36. The rotative axes defined by wheel shafts 42 are disposed in substantially parallel relation. The wheels 41 are adapted to support the load of the workpiece 10 and usually disposed closely adjacent one side of the weld joint 15, as is indicated in FIG. 1.

A fluid-operated ram 43, constituting a reciprocating linear actuator and a component part of an actuating means, is pivotally connected by pin 44 to bracket 25. The opposite end of the ram 43 is operatively and pivotally connected by pin 45 to the roll frame 35. More particularly, the ram 43 is located between the spaced bracket plates 26 and 27 of bracket 25 and between the spaced frame plates 37 and 38 of the roll frame 35. A similar ram 46 has one end pivotally mounted by pin 47 to the bracket 24 and has the opposite end operatively and pivotally connected by pin 48 to the other roll frame 36. The rams 43 and 46 operate to move the roll frames 35 and 36 toward and away from each other about the pivot axes defined by pins 33 and 34 respectively. The rams 43 and 46 provide an infinite adjustment of the roll frames 35 and 36 individually within angular limits whereby to move the workpiece 10 supported on the associated wheels 41 vertically and/or horizontally in order to align the workpieces 10 and 11 at the weld joint 15.

In addition, the actuating means includes a fluid pump 50 that is manually operable by lever 51, and which is operatively connected to the rams 43 and 46 by fluid lines 52 and 53 through control valves 54 and 55 respectively. The actuating means for the roll frames 35 and 36 is shown schematically at the bottom of FIG. 5. It will be understood that the fluid pump 50 and rams 43 and 46 may operate on either air or oil. Furthermore, it will be understood that a reciprocating linear actuator such as a screw may be substituted in lieu of the rams 43 and 46 or that a circular actuator attached to the roll frames 35 and 36 at the pivot axes defined by pins 33 and 34 may be utilized.

A second pair of roll frames 56 and 57 are pivotally mounted on spaced, substantially parallel pivot pins 60 and 61 respectively to the laterally spaced bracket 24. The roll frames 56 and 57 each include a pair of spaced, frame plates 62 and 63 located between the plates 26 and 27 of brackets 24. The outer ends of the roll frames 56 and 57 are partially enclosed by wheel guards 64.

Rotatively mounted to the outer end of each roll frame 56 and 57 is a wheel 65, the wheel shaft (not shown) constituting a rotative axis. The wheels 65 are located between the frame plates 62 and 63 of the associated roll frames 56 and 57. The wheels 65 are adapted to support the load of the workpiece 11 immediately adjacent the weld joint 15.

An actuating means, similar to that previously described with respect to the roll frames 35 and 36, is used to adjust the second pair of roll frames 56 and 57. For example, it is clear that a similar type of fluid-operated ram 43 is pivotally mounted to the roll frame 56 by a pivot pin 45 and is pivotally mounted to the spaced plates 26 and 27 of bracket 24 by a pivot pin (not shown), similar to pin 44. Moreover, a fluid-operated ram 46 is pivotally connected by pin 48 to the roll frame 57 and is pivotally mounted by a pin (not shown), similar to pin 47, to the spaced plates 26 and 27 of bracket 24.

A fluid pump 66, manually actuated by lever 67, is operatively connected to the rams 43 and 46 associated with the second pair of roll frames 56 and 57 through fluid lines 70 and 71, the flow being selectively controlled by valves 72 and 73. The actuating means is schematically illustrated by the middle diagram in FIG. 5. It will be immediately obvious that this diagram is identical to that illustrated with respect to the actuating means for operating the first pair of roll frames 35 and 36 previously described.

The second pair of roll frames 56 and 57 are movable toward and away from each other about the pivot axes defined by pins 60 and 61, and are adjustable infinitely between the angular limits. The roll frames 56 and 57 are individually adjustable to change the position of the supported workpiece 11 vertically and/or horizontally incident to aligning the workpieces 10 and 11 to form the suitable weld joint 15.

From FIG. 3, it will be apparent that the brackets 24 and 25 of the base 22 can be selectively shifted laterally to provide a predetermined spacing between such brackets 24 and 25. For example, the bracket 24 be detached from the supporting platform 23 and moved laterally away from the cooperating bracket 25 to a position indicated generally by 32, at which point the bracket 24 can be reattached to the platform 23. Adjustment of the brackets 24 and 25 are made to vary the distance of the two pair of roll frames 35–36 and 56–57 from the weld joint 15, and to provide optimum distribution of the workpiece weight on the idler roll assembly 17.

The location of the pivot pins 44 and 47 mounting one end of the rams 43 and 46 to the respective brackets 24 and 25 can be selectively moved from the lower position shown in FIG. 2 to an upper position illustrated in FIG. 4. The purpose of this change of pivot position is to change the angular limits between which the roll frames 35–36 and 56–57 can be adjustably moved to support and position the workpieces 10 and 11. It is clear from a comparison of the workpiece configuration illustrated in FIGS. 2 and 4 that the lower pivot position in FIG. 2 adapts the idler roll assembly for tanks of larger diameter while the upper pivot location in FIG. 4 adapts the idler roll assembly 17 for tanks of smaller diameter. To illustrate this change of position in FIG. 4, the pivot pins are designated 44a and 47a.

The base 22 is supported by selectively retractable casters 74 at each corner of platform 23. Each caster 74 is swivelly mounted to a bracket 75 that is hingedly mounted to the platform 23. A fluid-operated ram 76 is utilized to lower and raise each caster 74 incident to raising or lowering the base 22 respectively from the ground. One end of the ram 76 is pivotally mounted to the bracket 75 while the other end of the ram 76 is pivotally mounted to the platform 23. Actuating means is operatively connected to the rams 76, the means including a fluid pump 77 mounted on and carried by the base 22, the pump 77 being opertaively connected to the ram 76 by a fluid line 80. The pump 77 is manually operated by a lever 81.

The upper diagram of FIG. 5 represents the actuating means for the retractable casters 74. The rams 76 are operated by pump 82 having a manually actuated lever 83. Fluid line 80 connects the pump 77 to a T-fitting 91. A fluid line 90 operatively connects one ram 76 to pump 77 through the fitting 91. Three fluid lines 84, 85 and 86 operatively connect the other three rams 76 through the four-way fitting 87.

FIG. 6 graphically portrays that the center line or longitudinal rotative axis of the workpiece 10 or 11 can be offset with respect to the vertical center line of the idler roll assembly 17. For simplicity of illustration, the workpiece 10 is shown supported and positioned by wheels 41. This feature emphasizes that the roll frames 35-36 and 56-57 can be individually and separately adjusted infinitely within a range of angular limits either or both vertically and horizontally to move the workpiece to any position as permitted by such limits either or both vertically and horizontally.

It is thought that the functional advantages of the idler roll 17 have become fully apparent from the foregoing detailed description of parts but for completeness of disclosure, the usage and operation will be briefly described. It will be assumed that the workpieces 10 and 11 are placed on the power turning roll unit 12 and the cooperating idler roll unit 16 at locations remote from the adjacent portions that will form the weld joint 15. The powered turning roll unit 12 is rolled to a predetermined position on track 14 to accommodate the combined length of the workpieces 10 and 11.

Furthermore, the idler roll assembly 17 is made easily movable by lowering the casters 74 by actuation of the rams 76 through the fluid pump 77. The idler roll assembly 17 is moved under the workpieces 10 and 11 in the zone of the weld joint 15 as is shown in FIG. 1.

Prior to such positioning, the pivot pins 44 and 47 of the fluid-operated rams 43 and 46 are located in the selected lower position of FIG. 2 or the upper position of FIG. 4, depending upon the diameters of the workpieces 10 and 11. For the purpose of this example, it will be assumed that the pins 44 and 47 are in the lower position illustrated in FIG. 2.

In locating the idler roll assembly, the first pair of roll frames 35 and 36 are located on one side of the joint 15, while the second pair of roll frames 56 and 57 are located on the opposite side of the joint 15. If necessary, either one or both of the brackets 24 and 25 can be laterally adjusted in position on the supporting platform 23 to vary the spacing between the pairs of roll frames 35-36 and 56-57 in order that the weld joint 15 may be located therebetween and to provide suitable weight distribution on the idler roll assembly 17. After positioning of the idler roll assembly 17, the fluid pressure exerted by pump 77 is released so that the rams 76 will raise the casters 74 and seat the base 22 on the supporting flooor.

To align the adjacent portions of the workpieces 10 and 11 accurately to form the weld joint 15, the roll frames 35 and 36 can be adjusted individually by actuation of the fluid pump 50 and by selective manipulation of the control valves 54 and 55, whereby to move the workpiece portion either or both vertically and horizontally, and, if necessary, even to a position in which the rotative axis of the workpiece 10 is laterally offset from the center line of the idler roll assembly 17. Similarly, the second pair of roll frames 56 and 57 can be moved individually within their angular limits upon actuation of the associated fluid pump 66 and manipulation of the control valves 72 and 73, whereby to move the supported portion of the workpiece 11 either or both vertically and horizontally until the adjacent portions of the workpieces 10 and 11 are accurately aligned to form a suitable weld joint 15. Again, it will be understood that the supported workpiece 11 can be moved to a position in which its rotative axis is laterally offset from the vertical center line of the idler roll assembly 17, if necessary. The roll frames 35-36 and 56-57 will provide an infinite adjustment within the range permitted by the angular limits.

When the workpieces 10 and 11 have been accurately aligned, the weld joint 15 is tack-welded to interconnect the workpieces 10 and 11, and then the workpieces 10 and 11 as a unit are rotated by the powered turning roll unit 12 so that the torch 21 will form the annular weld seam 20.

Although the invention has been described by making detailed reference to a preferred embodiment, such detail is to be understood in an instructive, rather than in any restrictive sense, many variants being possible within the scope of the claims hereunto appended.

We claim as our invention:

1. In an idler roll assembly for supporting and adjustably positioning a workpiece, the improvement comprising:
    (a) a base,
    (b) a first pair of roll frames pivotally mounted to the base in side by side relation on spaced, substantially parallel pivot axes,
    (c) a wheel rotatively mounted on each roll frame, the wheels being adapted to support the underside of a first workpiece therebetween, and
    (d) actuating means operatively connected to each of the roll frames for individually pivotally adjusting the roll frames about the pivot axes so as to adjust either or both the vertical and horizontal positions of the first workpiece supported on top of the wheels,
    (e) the actuating means is a reciprocating linear actuator for each roll frame, the actuator having a first end pivotally mounted to the roll frame and a second end pivotally mounted to the base.

2. An idler roll assembly as defined in claim 1, in which:
    (f) means selectively mounts the said second end of each actuator to different locations on the base to provide different ranges of angular limits between which the roll frame associated with each actuator is pivotally moved.

References Cited

UNITED STATES PATENTS

| | | | |
|---|---|---|---|
| 1,870,760 | 8/1932 | Tipton | 214—340 X |
| 2,500,204 | 3/1950 | Ronay | 214—340 X |
| 3,008,439 | 11/1961 | Stanley | 214—340 |
| 3,090,513 | 5/1963 | Handwerk | 214—340 |
| 3,250,415 | 5/1966 | Wuesthoff | 214—340 |

ROBERT C. RIORDON, Primary Examiner

J. C. PETERS, Assistant Examiner

U.S. Cl. X.R.

214—340; 228—48